Patented Aug. 25, 1936

2,052,308

UNITED STATES PATENT OFFICE 2,052,308

PROCESS OF PRODUCING ODORLESS CORNSTARCH

Ralph W. Kerr, Riverside, Ill., assignor to International Patents Development Company, Wilmington, Del., a corporation of Delaware No Drawing. Application March 5, 1934, Serial No. 714,102

13 Claims. (Cl. 127—71)

This invention relates to the production of corn starch which will not become rancid but will be, and will remain for a long period of time, practically odorless.

A starch of this sort is particularly desirable for compounding with powdered sugar or for making pudding powders or for any other purpose where it is deirable that the product be, and remain, entirely free from any characteristic starch odor.

In carrying out the process in its complete and preferred form the starch in a water suspension is treated with small quantities of an oxidizing agent suitable for breaking down the oily constituent of the starch, which is comparatively odorless when the starch is fresh, but which in time tends of itself to break down and produce rancidity. These oxidized or partially oxidized substances, together with any excess of the oxidizing agent, are removed from the starch, so far as possible, by washing, but, as the preferred oxidizing treatment produces discoloration, the starch is bleached before washing to remove such discoloration and any organic coloration originally in the starch. After being dried, the starch is subjected to regulated heat, accompanied by agitation, for the purpose of removing volatilizable constituents organically in the starch which include the residue of the oxidized or partially oxidized oily constituent not completely removed by the washing operation. By referring to the volatilizable constituents as organically in the starch, water is intended to be excluded although the heat treatment may, incidentally, extract some part of the small water content left in the starch after the precedent drying operation.

It is possible by the heat treatment alone and without the precedent oxidation step to remove the substances causing rancidity, at least to some extent, and in some batches of starch to a larger extent; but in order that the heat treatment alone be effective to this end, at least in many cases, it will have to be prolonged to such extent that the commercial feasibility of the process would be doubtful, besides which there would be serious danger of the starch being detrimentally affected in other respects, for example in color and viscosity. By first breaking down the oily or fatty constituent of the starch and removing the oxidized material so far as possible by washing, and then applying heat to the starch in a dry substantially pulverulent state and with continual stirring so that the heat is uniformly applied through the body of starch under treatment, it is possible to volatilize and remove substantially all of the substances which, if left in the starch, would ultimately give rise to rancidity; and this without discoloration or other modification of the starch. It is necessary, however, to dry the starch before subjecting it to the last mentioned heat treatment. If the starch contains substantially more moisture than is contained (because of its hygroscopicity) in air dry starch, that is about 14%, and is heated to a temperature and for a period of time sufficient to drive off the before mentioned volatilizable substances, there will be great danger of the starch being discolored, gelatinized, dextrinized, converted, or otherwise modified (these changes in the starch being referred to herein by the general term of modification). In fact, it is preferable to have the moisture content considerably lower than that of air-dry starch. The hydrogen ion concentration of the starch is also a factor to be considered and if necessary should be adjusted before the starch is heated. If the pH is too high discoloration is likely to take place. A low pH increases the tendency to dextrinization. The preferable range is pH 4 to 4.4 and as the lower pH's increase the speed of the desired reaction the aim is to operate at as low a pH as possible. Either the pH of the starch should be adjusted or the temperature regulated in accordance with the existing pH, or both expedients used.

A typical and preferred procedure for carrying out the process of the invention is as follows:

Carefully washed starch mixed with water, for example 6,000 gallons of a 16° Baumé starch liquor, is put into a treating tank with 12 pounds of permanganate of potassium mixed with 20 gallons of water. The temperature in the tank is preferably maintained at about 100° F. and the material is allowed to stand for about twenty minutes. There is then introduced into the tank one-half gallon of 66° Baumé sulphuric acid, in fifty gallons of water, together with six gallons of bisulphite of soda.

The permanganate of potassium oxidizes the oils in the starch, and perhaps some of the protein (these substances being referred to in the claims, generally, as the oily constituent of the starch) but it also tends to turn the starch a brown color. The bisulphite of soda and sulphuric acid produces sulphurous acid which operates to remove the brown color from the starch and give the starch its original whiteness.

The material is thereafter put through shakers to remove any lumps. This is a preferred, but perhaps not an essential step of the process.

The procedure as so far described, that is to say, the treatment of the starch first with the permanganate salt and then with sulphuric acid and bisulphite of soda is not claimed per se as the present applicant's invention, such being the invention of Otto A. Sjostrom and covered by application for patent filed by him July 14, 1934, Serial No. 735,296; the oxidation of the oily constituent of the starch being claimed herein only in combination with and as a step precedent to the procedures which will next be described.

The screened starch liquor, in accordance with the present invention is then filtered and washed, preferably on a vacuum or other displacement filter, to remove the major portion of the water from the starch, the oxidized substances, excess of chemical agents and their reaction products; the starch liquor being preferably heated to 120° F., before being sent to the filters, so as to assure the best filtering conditions.

The starch from the filters is dried in trays or otherwise, to a moisture content of preferably 5%, or to some moisture content not substantially in excess of 14% (approximately the moisture content of air-dry starch); and while still hot is subjected to a relatively high temperature, preferably with stirring or agitation, for several hours; temperature and time being calculated, with relation also to the pH of the material, so that there will be no substantial modification, or discoloration of the starch at this stage.

Preferably the pH is between 4 and 4.4; the heating temperature about 180° F.; and the duration of treatment in the neighborhood of 10 to 20 hours. The operation is carried on best in the ordinary dextrine cooker, the walls of which are heated and which is provided with a stirring device to distribute the heat through the material treated. The pH of the starch can be regulated in the precedent filtering and washing operations on the vacuum filters. If the pH is higher than indicated it is necessary to reduce the duration of the heat treatment. Too high a pH is likely to produce discoloration. If the pH is much below the indicated range there will be a tendency to dextrinization, because of the presence of the acid. This tendency can be checked to some extent by a longer heating period at lower temperature.

If the temperature is too high—substantially above 180° F., there is, in my experience, a tendency for the starch to be modified to the form known as British gum.

Under the proper conditions, as indicated, the volatilizable constituents of the starch will be driven off without any appreciable modification of the starch which is in fact a raw starch pulverulent in form and deprived of its oxidizable constituent and volatilizable matter so that it will be, and will remain, entirely free from odor.

As will be gathered from the foregoing the process may be modified without departure from the principles of the invention. In addition to the modifications suggested, oxidizing agents other than potassium permanganate may be employed, such, for example, as perchlorate of potassium, perborate of potassium, dichromate of potassium, chlorine gas, ozone and nitrous oxide gas. The intention is to cover all modifications within the scope of the appended claims.

I claim:

1. Method of treating corn starch to prevent the development of rancidity which comprises: subjecting the starch to the action of an oxidizing agent which breaks down the oily constituent of the starch; and thereafter heating the starch with its moisture content not substantially in excess of that of air-dry starch, at a temperature which drives off the organic volatilizable substances in the starch tending to produce rancidity without effecting any substantial modification of the starch.

2. Method of treating corn starch to prevent the development of rancidity which comprises: subjecting the starch to the action of an oxidizing agent which breaks down the oily constituent of the starch; and thereafter heating the starch with its moisture content not substantially in excess of that of air-dry starch, at a temperature not substantially in excess of 180° F. which drives off the organic volatilizable substances in the starch tending to produce rancidity, without effecting any substantial modification of the starch.

3. Method of treating corn starch to prevent the development of rancidity which comprises: subjecting the starch to the action of an oxidizing agent which breaks down the oily constituent of the starch; and thereafter heating the starch with its moisture content not substantially in excess of that of air-dry starch, at a temperature of about 180° F. for from 10 to 20 hours to drive off the organic volatilizable substances in the starch which tend to produce rancidity without effecting any substantial modification of the starch.

4. Method of treating corn starch to prevent the development of rancidity which comprises: subjecting the starch to the action of an oxidizing agent which breaks down the oily constituent of the starch; and thereafter heating the starch at a pH value between 4 and 4.4, and a moisture content not substantially in excess of that of air-dry starch, at a temperature which drives off the organic volatilizable substances in the starch tending to produce rancidity without effecting any substantial modification of the starch.

5. Method of treating corn starch to prevent the development of rancidity which comprises: subjecting the starch to the action of an oxidizing agent which breaks down the oily constituent of the starch; and thereafter heating the starch containing substantially 5% moisture, at a temperature which drives off the organic volatilizable substances in the starch tending to produce rancidity without effecting any substantial modification of the starch.

6. Method of treating corn starch to prevent the development of rancidity which comprises: subjecting the starch in suspension in water to the action of an oxidizing agent which breaks down the oily constituent of the starch; de-watering and washing the starch; drying the starch to a moisture content substantially below that of air-dry starch; and heating the dried starch at a temperature which drives off the organic volatilizable substances in the starch tending to produce rancidity without effecting any substantial modification of the starch.

7. Method of treating corn starch to prevent the development of rancidity which comprises: subjecting the starch in suspension in water to the action of an oxidizing agent which breaks down the oily constituent of the starch; de-watering and washing the starch; drying the starch to a moisture content of approximately 5%; and heating the dried starch, with a substantially uniform distribution of the heat throughout the body of the starch under treatment, at a temperature not substantially in excess of 180° F.

which drives off the organic volatilizable substances in the starch tending to produce rancidity without effecting any substantial modification of the starch.

8. Method of treating corn starch to prevent the development of rancidity which comprises: subjecting the starch in suspension in water to the action of an oxidizing agent which breaks down the oily constituent of the starch; de-watering and washing the starch; drying the starch to a moisture content of approximately 5%; and heating the dried starch, at a pH value between 4 and 4.4, at a temperature not substantially in excess of 180° F.

9. Method of treating corn starch to prevent the development of rancidity which comprises: subjecting the starch to a fluid starch and water mixture to the action of an oxidizing agent which breaks down the oily constituent of the starch; de-watering and washing the starch; drying the starch to a moisture content substantially below that of air-dry starch; and heating the dried starch at a temperature which drives off the organic volatilizable substances in the starch tending to produce rancidity without effecting any substantial modification of the starch.

10. Method of treating corn starch to prevent the development of rancidity which comprises: subjecting the starch in a fluid starch and water mixture to the action of permanganate of potassium; bleaching the starch with sulphurous acid; de-watering and washing the starch; drying the starch to a moisture content substantially below that of air-dry starch; and heating the dried starch, at a temperature which drives off the organic volatilizable substances in the starch tending to produce rancidity without effecting any substantial modification of the starch.

11. Method of treating corn starch to prevent the development of rancidity which comprises: heating the starch containing approximately 5% of moisture at a temperature not substantially in excess of 180° F. to drive off organic volatilizable substances in the starch tending to produce rancidity without effecting any substantial modification of the starch.

12. Method of treating corn starch to prevent the development of rancidity which comprises: heating the starch, having a moisture content substantially less than that of dry air starch with agitation which uniformly distributes the heat and, at a temperature not substantially in excess of 180° F. which drives off organic volatile substances in the starch without producing any substantial modification of the starch.

13. Method of treating corn starch to prevent the development of rancidity which comprises: heating the starch having a pH value between 4 and 4.4 and a moisture content not substantially in excess of that of dry starch at a temperature not substantially in excess of 180° F. to drive off organic volatile substances in the starch without producing any substantial modification of the starch.

RALPH W. KERR.

CERTIFICATE OF CORRECTION.

Patent No. 2,052,308.  August 25, 1936.

RALPH W. KERR.

It is hereby certified that error appears in the printed specification of the above numbered patent requiring correction as follows: Page 3, first column, line 17, claim 9, for "to" read in; and second column, line 18, claim 12, for "dry air" read air dry; and that the said Letters Patent should be read with these corrections therein that the same may conform to the record of the case in the Patent Office.

Signed and sealed this 1st day of December, A. D. 1936.

(Seal)

Henry Van Arsdale

Acting Commissioner of Patents.